United States Patent [19]
Tanner

[11] 3,876,450
[45] Apr. 8, 1975

[54] METHOD AND COMPOSITION FOR TRANSPARENT ABRASION-RESISTANT COATING

[75] Inventor: W. J. Tanner, Atlanta, Ga.

[73] Assignee: W. J. Tanner, Inc., Cornelia, Ga.

[22] Filed: Aug. 13, 1973

[21] Appl. No.: 387,874

[52] U.S. Cl. .................. 117/54; 65/350; 117/33.3; 117/47 A; 117/47 R; 117/106 R; 117/124 A; 117/124 C; 117/160 R; 117/130 E; 351/166
[51] Int. Cl. ............................................ G02b 1/10
[58] Field of Search........... 117/54, 71, 33.3, 106 R, 117/124 A, 124 C, 130 E, 47 A, 47 R; 351/160 R–166; 65/350

[56] References Cited
UNITED STATES PATENTS

| | | | |
|---|---|---|---|
| 2,287,546 | 6/1942 | Binda | 65/350 |
| 2,904,450 | 9/1951 | Irland et al. | 117/333 |
| 3,645,779 | 2/1972 | Kienel et al. | 117/106 R |

Primary Examiner—William R. Trenor
Attorney, Agent, or Firm—David H. Semmes

[57] ABSTRACT

An abrasion-resistant transparent coating for plastics, glass and the like, comprised of aluminum oxide embeded in a metalic matrix. The composition is characterized by the use of aluminum oxide as the abrasive resistant coating, as well as its amalgamation into a metal matrix.

7 Claims, 2 Drawing Figures

METHOD AND COMPOSITION FOR TRANSPARENT ABRASION-RESISTANT COATING

BACKGROUND OF THE INVENTION

1. Field of the Invention

Plastic materials are currently available with refractive properties equivalent or superior to glass. Use of plastic has been precluded by the susceptibility of plastic to scratching. Efforts have been made to coat plastic materials with harder substances, such as silicon dioxide. These efforts have been unsuccessful because it was not realized that no coating can be stronger than the adhesive with which it is bonded to the plastic.

The present process utilizes synthetic sapphire (or aluminum oxide) embedded in a metal matrix. The hardness of the coating is then approximately the root mean of the hardness of sapphire and that of the precious metal alloy matrix.

Precious metals are easily chemically deposited on a variety of materials because they are very chemically unreactive. A metal coating can be quite transparent if it is thin enough. In this process, the metal coating is so thin that it is practically transparent. Sapphire, of course, is transparent.

2. Description of the Prior Art

Binda, U.S. Pat. No. 2,287,546;
Irland, et al., U.S. Pat. No. 2,904,450;
Kienel, U.S. Pat. No. 3,645,779.

Binda discloses a plastic lens having a glass film coating. Irland shows a plastic substrate having a layer of germanium adjacent the plastic and a layer of an oxide of silicon superimposed upon the germanium layer. The germanium is evaporated for deposition and followed by an evaporated layer of powdered silicon and silicon dioxide. Kienel teaches vapor depositing a two component glass on a plastic which consists of boron, oxide and silicon dioxide.

Thus, the prior art is consistent in its teachings that silicon dioxide is used as the abrasive-resistant layer.

SUMMARY OF THE INVENTION

Plastic materials are currently available with refractive properties equivalent or superior to glass. Use of plastic has been precluded by the susceptibility of plastic to scratching. Efforts have been made to coat plastic materials with harder substances, such as silicon dioxide. These efforts have been unsuccessful because it was not realized that no coating can be stronger than the adhesive with which it is bonded to the plastic.

The present process utilizes synthetic sapphire (or aluminum oxide) embedded in a metal matrix. The hardness of the coating is then approximately the root mean of the hardness of sapphire and that of the precious metal alloy matrix.

Precious metals are easily chemically deposited on a variety of materials because they are very chemically unreactive. A metal coating can be quite transparent if it is thin enough. In this process, the metal coating is so thin that it is practically transparent. Sapphire, of course, is transparent.

This process involves an amalgamation, which causes sapphire (aluminum oxide $AL_2O_3$) of mean diameter of 9 microns to be embedded in this amalgamated metal matrix. This invention differs from earlier abrasion-resistant material coatings (U.S. Pat. Nos. 2,904,450 and 3,645,779) in that first the abrasion-resistant substance is aluminum oxide and not silicon dioxide; and second that the coating is not composed of two separate metalic-non metalic layers (c.f. U.S. Pat. No. 2,904,450); but of one layer comprised of the abrasion resistant substance embedded in a metalic matrix. The use of aluminum oxide as the abrasive resistant coating is nowhere mentioned in the literature, although the use of aluminum oxide to prepare the disposition surface for disposition or another material is discussed (U.S. Pat. No. 3,645,779). It should be remarked that aluminum oxide is distinctly harder than the previously used substance, silicon dioxide. Also, all previous coating processes utilize a vacuum deposition chamber (U.S. Pat. Nos. 2,287,546; 2,904,450; and 3,645,779) and the present method does not.

According to the present method, this coating results in an improved scratch resistance when applied to a variety of materials, such as polycarbonate plastics, acrylic plastics, methylmethacrylate plastics, and even flint glass. Since this coating is extremely thin, it appears transparent. The coating thickness is approximately 10–50 microns. The coating is not prone to crack, check, or peel spontaneously such as was observed in previous coatings (U.S. Pat. No. 2,904,450). This advantage is due primarily to the novel metal-matrix nature of the coating; which allows it to be more elastic and less brittle.

DESCRIPTION OF THE PREFERRED EMBODIMENTS

Figure 1:
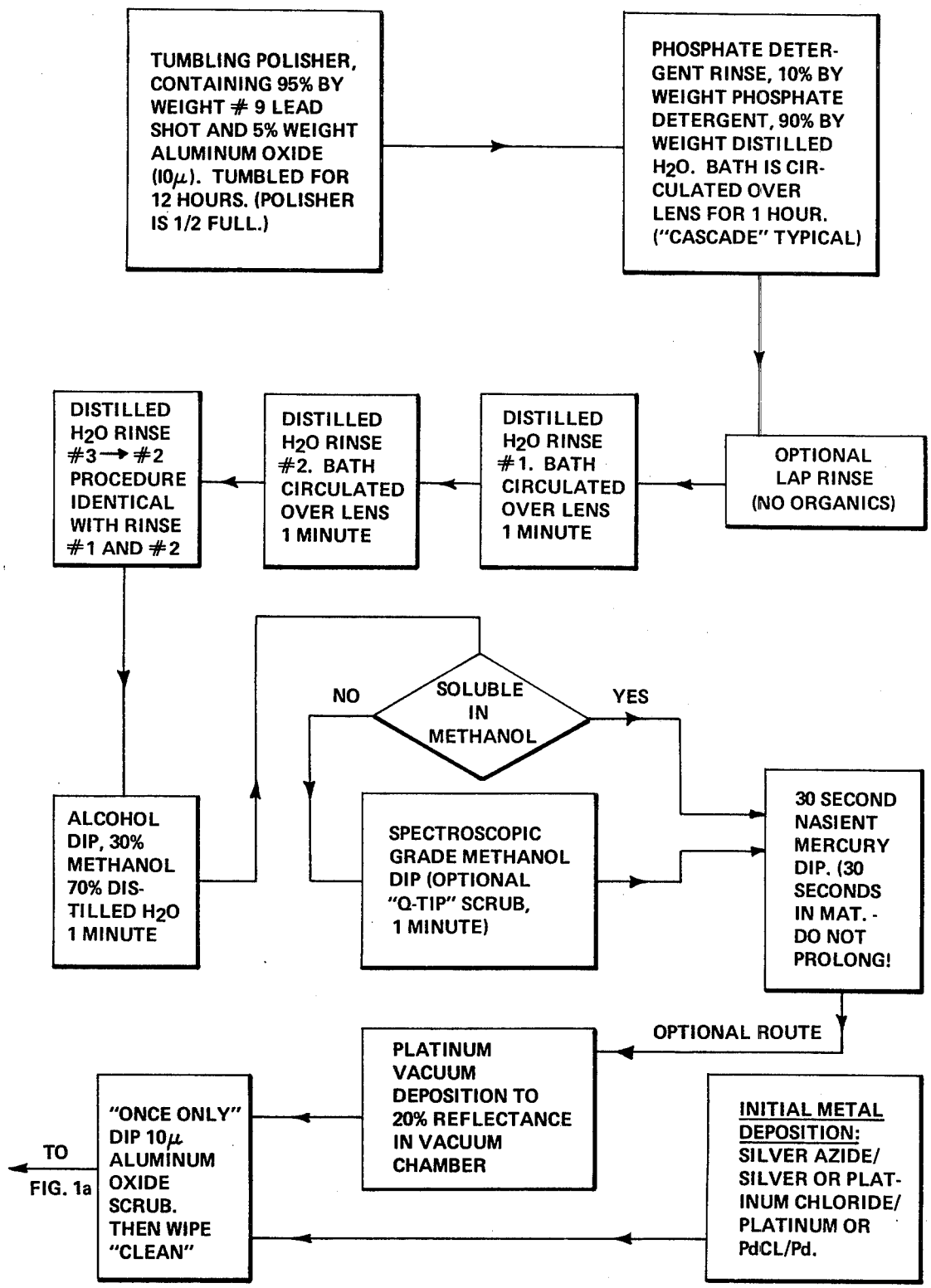
FIG. 1 sequentially depicts the initial steps in a method for transparent, abrasion-resistant coating, according to the present invention, with FIG. 1A which illustrates the concluding steps of this method.
Figure 1A:
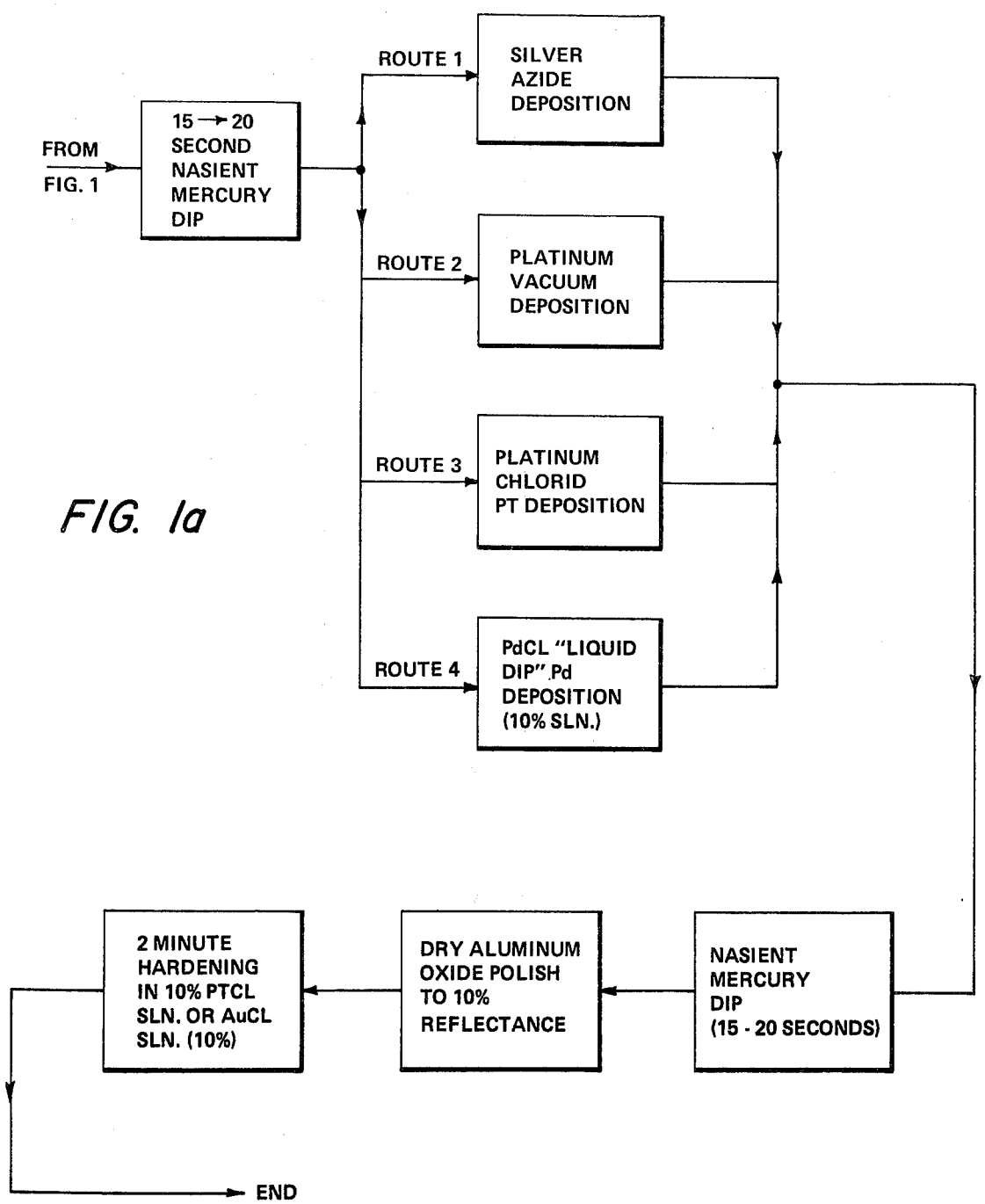

The substrate is initially cleaned with a phosphate detergent, then rinsed seven times with tap water and three times with distilled water. Additional cleaning follows with ether, acetone or methanol; depending upon the solubility of the substrate.

By the use of either mechanical abrasion or silver deposition; *Henley's Twentieth Century Book of Formulas, Processes, and Trade Secrets*, Books, Inc., N.Y. 1962. Pg. 476; the first initial coat of metal is applied to a thickness of 1 or 2 microns (mechanical abrasion can include such simple techniques as metalic shot and aluminum oxide).

For the method of silver deposition, a two part solution is used. The first part is composed as follows: to 235 ml of boiling distilled water is added 10 grams of silver nitrate and 10 grams of sodium potassium tartrate. The solution is boiled for 8 minutes and filtered. It is then allowed to cool.

The second part of this two-part solution is prepared by the addition of 12.5 grams of silver nitrate to 50 ml of distilled water. Twenty-six degree amonia is added to this solution until it becomes clear, when it is then diluted to 235 ml with distilled water. The second part of this solution is then filtered, and mixed with an equal amount of the first part. Silver rapidly plates out on either plastic or glass.

The coated material is then brushed with aluminum oxide of mean diameter of 9 microns.

A 30 second mercury dip follows, in which an amalgam is formed with the metal initially on the original substrate. An additional aluminum oxide brushing is then performed.

The mercuric amalgam is then partially removed (by ionic replacement) by immersion in either 10% gold chloride or 10% platinum chloride solution, in which generous quantities of aluminum oxide have been added.

The process then continues similarly. The surface is successively brushed with aluminum oxide, dipped in mercury, brushed with aluminum oxide again; and then painted with gold or platinum chloride to remove part of the mercury and harden the amalgam that remains.

EXAMPLE 1

Polymethylmethacrylate was coated by this process and tested on a Rockwell Hardness Tester at 7.4; where glass tests at 6.0 and diamond at 9.0.

According to the flow sheet, as set forth in the drawing, the plastic lens to be coated is inserted within a tumbling polisher, half filled with 95% by weight of number 9 lead shot and 5% by weight of aluminum oxide (10 microns) and is then tumbled for 12 hours within the tumbler. A phosphate detergent rinse 10% by weight of phosphate detergent and 90% by weight of distilled $H_2O$ is applied and the rinse is circulated over the lens for one hour, for example by cascading. An optional lap rinse may be employed prior to a succession of 7 distilled water rinses, circulating the water over the lens for 1 minute each rinse. The lens is then dipped into a solution of 30% mythanol and 70% distilled water. If the plastic appears to be soluble in methanol it is applied directly to a 30 second nascent mercury dip. On the other hand, if the plastic is not soluble in methanol a spectrascopic grade methanol dip may be applied with Q-tip spreading for one minute prior to the 30 second nascent mercury dip. The initial metal deposition may then be applied by silver azide/silver or platinum chloride/platinum or palladium, chloride/palladium, prior to a "once only" dry 10 micron aluminum oxide scrub which is then wiped clean. Alternatively, and prior to the dry 10 micron aluminum oxide scrub, platinum may be applied by vacuum deposition to 10% reflectance in a vacuum chamber.

Subsequently, to the dry 10 micron aluminum oxide scrub, the lens is applied to a 15 to 20 second nascent mercury dip and then treated to a second metal deposition according to any one of the following routes:

I — Silver azide deposition;
II — Platinum vacuum deposition;
III — Platinum chloride/platinum deposition;
IV — Palladium chloride "liquid dip" deposition (10% solution).

After the second metal deposition, the lens is subjected to a third (15 to 20 second) nascent mercury dip, a dry aluminum oxide polish to a 10% reflectance and a two minute hardening in 10% platinum chloride solution or gold chloride solution (10%).

I claim:

1. A method of applying an abrasion-resistant coating to a transparent glass or plastic substrate, comprising:
   A. polishing by tumbling said substrate in an environment of aluminum oxide particles, so as to form an initial aluminum oxide coating upon said substrate;
   B. rinsing said substrate with detergent and water;
   C. dipping said substrate in alcohol;
   D. dipping said substrate in nascent mercury;
   E. silver plating said substrate such that an amalgam of silver and aluminum oxide coating is developed;
   F. dry scrubbing said substrate with aluminum oxide particles;
   G. silver plating said substrate;
   H. dipping said substrate in nascent mercury;
   I. polishing with aluminum oxide particles to 10% reflectance;
   J. and hardening in a 10% chloride solution of the group consisting of gold and platinum.

2. A method in accordance with claim 1, wherein said silver plating is by means of silver azide.

3. A method of applying an abrasion-resistant coating to a transparent glass or plastic substrate, comprising:
   A. polishing by tumbling said substrate in an environment of aluminum oxide particles, so as to form an initial aluminum oxide coating upon said substrate;
   B. rinsing said substrate with detergent and water;
   C. dipping said substrate in alcohol
   D. dipping said substrate in nascent mercury;
   E. platinum plating said substrate such that an amalgam of platinum and aluminum oxide coating is developed;
   F. dry scrubbing said substrate with aluminum oxide particles;
   G. platinum plating said substrate
   H. dipping said substrate in nascent mercury;
   I. polishing with aluminum oxide particles to 10% reflectance;
   J. and hardening in a 10% chloride solution of the group consisting of gold and platinum.

4. A method in accordance with claim 3, wherein said plating is by means of platinum vacuum deposition.

5. A method in accordance with claim 3, wherein said plating is by means of platinum chloride deposition.

6. A method of applying an abrasion-resistant coating to a transparent glass or plastic substrate, comprising:
   A. polishing by tumbling said substrate in an environment of aluminum oxide particles, so as to form an initial aluminum oxide coating upon said substrate;
   B. rinsing said substrate with detergent and water;
   C. dipping said substrate in alcohol;
   D. dipping said substrate in nascent mercury;
   E. palladium plating said substrate such that an amalgam of palladium and aluminum oxide coating is developed;
   F. dry scrubbing said substrate with aluminum oxide particles;
   G. palladium plating said substrate
   H. dipping said substrate in nascent mercury;
   I. polishing with aluminum oxide particles to 10% reflectance;
   J. and hardening in a 10% chloride solution of the group consisting of gold and platinum.

7. A method in accordance with in claim 6, wherein said plating is by means of dipping in a 10% solution of palladium chloride.

* * * * *